(No Model.)

3 Sheets—Sheet 1.

G. A. BOYDEN.
FLUID PRESSURE BRAKE.

No. 280,285.  Patented June 26, 1883.

Witnesses:
A. E. Eader
John E. Morris

Inventor:
Geo A. Boyden
By Chas B. Mann
Attorney.

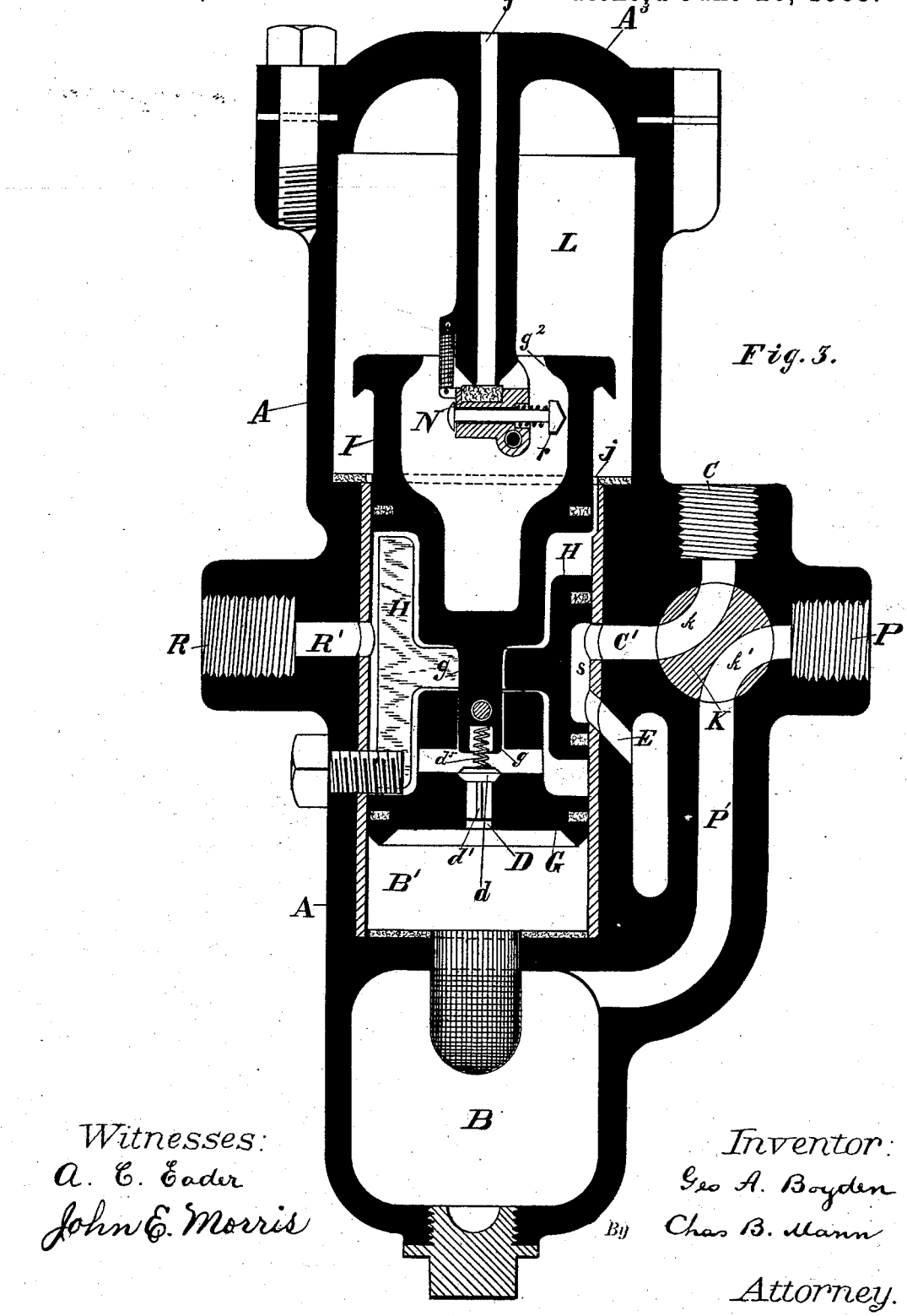

UNITED STATES PATENT OFFICE.

GEORGE A. BOYDEN, OF BALTIMORE, MARYLAND, ASSIGNOR OF ONE-HALF TO CHARLES B. MANN, OF SAME PLACE.

FLUID-PRESSURE BRAK

SPECIFICATION forming part of Letters Patent No. 280,285, dated June 26, 1883.

Application filed April 30, 1883. (No model.)

*To all whom it may concern:*

Be it known that I, GEORGE A. BOYDEN, a citizen of the United States, residing at Baltimore, State of Maryland, have invented certain new and useful Improvements in Fluid-Pressure Brakes, of which the following is a specification, reference being had therein to the accompanying drawings.

My invention relates to certain improvements in fluid-pressure brakes for railway-trains, and to an improved method of applying and maintaining the application of the brakes.

The objects of the invention are, first, to provide for replenishing, while the brake is on, the air-reservoir on each car or the brake-cylinder when the pressure therein has been lessened by leakage, and to accomplish this through a single line of train-pipe and by means which shall at all times be wholly under the control of the engineer, and also to provide for the more rapid charging than heretofore of the air-reservoir on the car, and also to obviate the necessity of applying the brakes with such a high pressure as heretofore has been necessary with the automatic brake, the effect of which is to slide the wheels and flatten them; second, to provide for dispensing with the main air-reservoir on or near the locomotive, and thereby simplify and cheapen the apparatus; third, to provide for the quicker release of the brake.

My invention consists, first, in the several combinations, hereinafter specified, with an air-reservoir on the car, of means whereby the said air-reservoir may be replenished or recharged with compressed air while the passages or ports leading therefrom to the brake-cylinder are open and while the brakes are applied; second, in the combination, with an air-reservoir on the car and air-compressing apparatus on the locomotive, of means whereby is afforded the principal advantages of the "automatic" brake system, as well as the direct compressed-air system, without employing the usual main air-reservoir on or near the locomotive; third, in the combination, with an air-reservoir on the car, of a brake-releasing valve, whereby, when the train-pipe contains the maximum fluid-pressure, the brakes will be released quickly; fourth, in a new method of applying and maintaining the application of the brakes through a single line of train-pipe, as hereinafter specified.

Figure 1:
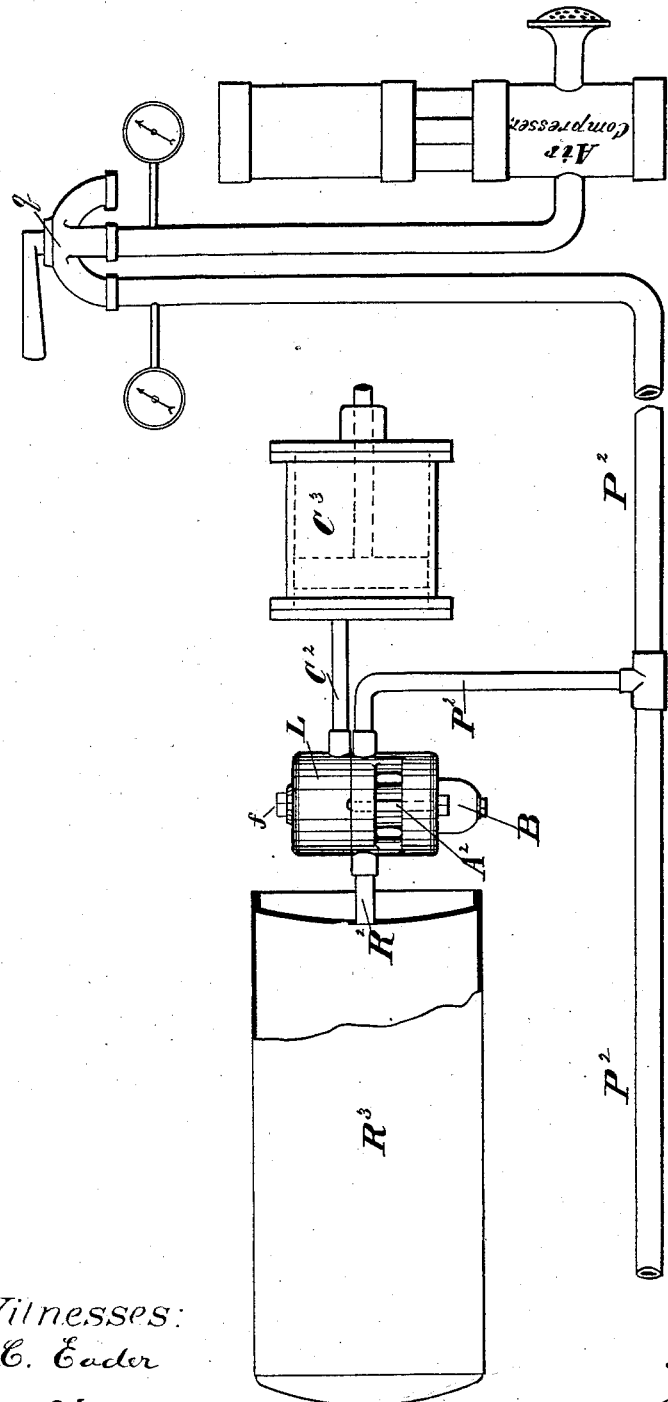
Figure 2:
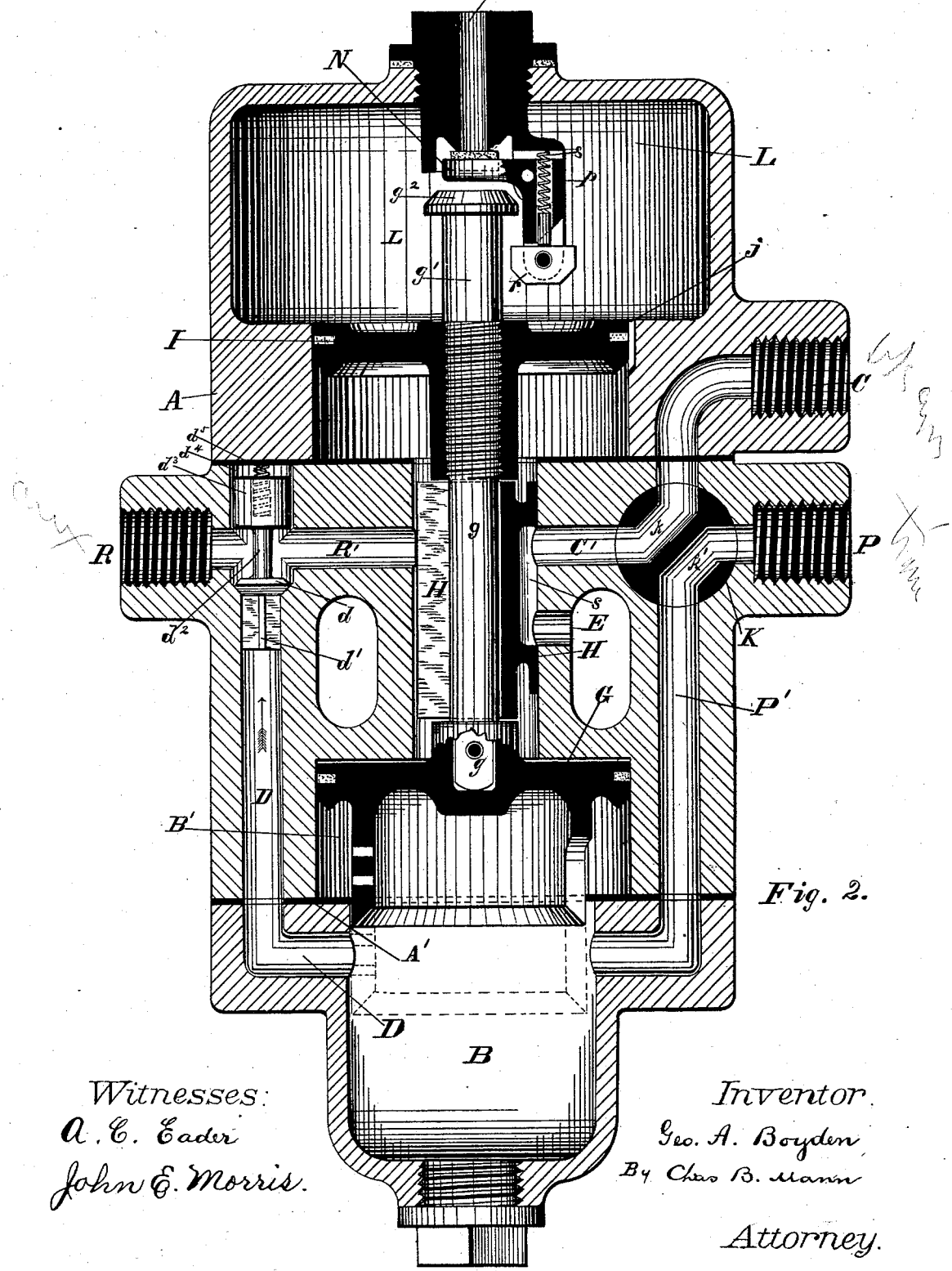

Figure 1 is a view of the parts properly assembled of a brake apparatus embodying my invention. Fig. 2 is a sectional view, showing one plan of constructing the valve mechanism and air-cushion chamber. Fig. 3 is a sectional view, showing another plan of constructing the same parts.

The letter A designates the case of the valve; B, the drip-chamber attached at the bottom, (see Fig. 2,) and A' packing interposed between these parts, which are united by bolts $A^2$. (See Fig. 1.)

At the port P the train-pipe $P^2$ is attached. From this port a passage, P', leads to the drip-chamber B. Adjoining this chamber is a cylinder, B', fitted with a piston, G, which connects with a slide-valve, H, by means of a stem or rod, $g$. Instead of a slide-valve an ordinary three-way cock may be used. The slide-valve H has a cavity, $s$, long enough to uncover the passage C' and the exhaust-port E and put them in communication. The passage C' has outlet at port C, from which the pipe $C^2$ connects with the brake-cylinder $C^3$.

At the port R is connected the pipe $R^2$, which leads to the air-reservoir $R^3$ on the car. R' is a passage direct from this port to the valve-chamber.

A four-way cock, K, with ports $k\ k'$, is arranged in line of the fluid-pressure communication, to provide for operating the brakes of the car by either the automatic system or the direct compressed-air system, according as the train of which the car forms part may happen to be fitted out.

The construction of the parts thus far described may vary or be changed in many ways without materially affecting the operation or result of my improvements, which I will now proceed to describe:

Extending from the drip-chamber is a passage, D, provided with a check-valve, $d$, adapted at all times to allow compressed air from the train-pipe $P^2$ to reach the air-reservoir on the car, but preventing its return therefrom, whereby no loss of fluid-pressure from reservoir $R^3$ can occur in case of accidental separation of the car from the train, and serving also, as hereinafter explained, to allow compressed air from the train-pipe to reach the brake-cylinder $C^3$ while the brake is applied. As the fluid-pressure can take but one direction in this passage, I call it "an always-open one-way passage." A passage substantially like this, always open for fluid-pressure to reach the air-reservoir on the car, constitutes one feature of my invention.

The check-valve $d$ may be constructed in any suitable manner. In the present case it has crossed wings $d'$, which fit in the passage and adapt it to slide like a piston, so that the valve may leave its seat. In Fig. 2 a shank or rod, $d^2$, projects from the valve, and has attached a head, $d^3$, which fits in a cylinder or bore, $d^4$. A spiral-spring, $d^5$, bears on the head in such manner as to keep the check-valve normally to its seat. At the other end of the piston stem or rod $g$, and connected thereto, is a second piston, I, fitting and arranged to move in a cylinder provided with a port, $j$, adapted to be closed when the piston is in one position and to be opened when the piston is in another. This port connects with an air-cushion chamber, L. This air-cushion, or its equivalent, constitutes a feature of my invention. The air-cushion chamber L may be constructed without any opening, port, or valve whatever other than the one $j$, which is opened and closed by the piston I. This air-cushion chamber is employed to receive compressed air transmitted through the train-pipe at the maximum pressure. When the brakes are off, the piston I is in the position shown, and the fluid-pressure in the air-cushion chamber, which is on the outer side of the piston, is the same as the pressure on the inner side of the piston; but when the fluid-pressure in the train-pipe $P^2$ is reduced, such reduction of course is felt on the inner side of the piston, and thereupon the maximum pressure existing in the air-cushion chamber presses the piston I back, and through the stem $g$ shifts the slide-valve H, closing the exhaust-port E and opening direct communication between the air-passage $R'$ and the brake-cylinder passage $C'$, thereby applying the brakes. It will thus be seen the first effect produced by the fluid-pressure in the air-cushion chamber is to shift the valve H, which applies the brakes. Heretofore in the Westinghouse brake the shifting of the valve has been effected wholly by the back action of the fluid-pressure in the auxiliary air-reservoir. Now, after a lessening of the fluid-pressure in the reservoir on the car or brake-cylinder, by leakage, has occurred, the maximum pressure in the chamber L has the further effect to act as an air-cushion to hold the valve H in the same position while the engineer manipulates the cock $q$ on the locomotive to allow compressed air from the compressing apparatus to be transmitted through the always-open one-way-only passage D under a less pressure than the maximum, or less than that in the chamber L, to recharge and to continue charging the reservoir and brake-cylinder while the brakes are applied. This is a new and an important achievement through a single line of train-pipe, and enables me to dispense with the customary main air-reservoir on or near the locomotive, and constitutes a new method of maintaining the application of the brakes after they have been applied, and is a feature of my present invention. As long as the recharging is continued with the fluid under a less pressure than the maximum, or less than that in the chamber L, there will be no relaxation of the grip of the brake-shoes on the wheels.

Instead of a piston, I, for the fluid-pressure in the air-cushion chamber L to press against, a flexible or elastic diaphragm with suitable valves might be substituted. So far as concerns the air-cushion, of which the piston I is a part or necessary adjunct, I include as within my invention all known equivalents for the piston which will operate substantially as herein set forth.

It has been stated that the air-cushion chamber may be constructed without other opening, port, or valve than that which is opened and closed by the piston I; but in the present instance a valve, N, is provided in the said chamber, and its use effects the quick release of the brake, and the same constitutes another feature of my invention. This brake-releasing valve consists, as shown in Fig. 2, of the escape-port $f$, a right-angled lever, P, one arm of which carries the valve N, which closes the escape-port, and the other arm of which carries a pivoted trigger, $r$. This arm is adapted to move laterally. When pressed down at one side, the trigger will yield, but when pressed upward on the same side it is unyielding. A spring, $s$, is arranged to keep the trigger normally in a given position. The piston-stem $g$ has its upper end, $g'$, projecting past the piston I and into the air-cushion chamber. A head, $g^2$, is on the projecting end.

From this description of the drawing it will now be understood that when on applying the brakes the piston I is pressed back by the maximum fluid-pressure in the chamber L the trigger $r$ will yield as the head $g^2$ on the stem passes down, thereby allowing the head to pass. When the maximum fluid-pressure is transmitted from the compressing apparatus on the locomotive to release the brakes, the pistons and stems are forced up; but their upward movement now would ordinarily be tardy, because of the resistance of the air-cushion, and hence the brake now would be released slowly. This tardy release of the brake is a difficulty also sometimes experienced in the Westinghouse automatic brake on account of the resistance of the air in the auxiliary reservoir. To remedy this therefore, when the stem starts on its upward movement the head $g^2$ at once comes in contact with the trigger $r$, which, not yielding, causes one arm P of the lever to move laterally, thereby removing the valve N from its seat over the escape-port and instantly allowing the fluid-pressure in the chamber to exhaust. There being then no longer any resistance, the brakes will be released instantly.

To charge the brake apparatus with fluid-pressure, compressed air from the compressing apparatus is transmitted through the train-pipe, and then direct through the always-open one-way passage to the air-reservoir. In charging as here described the circuitous and smaller passages or ports of the Westinghouse triple valve heretofore used are avoided. The fluid-pressure thus transmitted from the compressing apparatus, coming against the pistons G and I, forces them up, thereby closing the brake-cylinder passage C' and opening the port $j$, which allows the maximum fluid-pressure to enter the air-cushion chamber L. The same pressure at the outset will therefore exist on both sides of the piston I. Now, to apply the brakes, the engineer by slightly opening the cock $q$ reduces the pressure in the train-pipe below the maximum stored in the air-cushion chamber, whereupon the effect is to press the pistons I G down, thus allowing the fluid-pressure in the reservoir $R^3$ to pass through passages R' and C' into the brake-cylinder and apply the brakes. When through a lessening of the fluid-pressure by leakage it is desired to replenish or recharge the brake-cylinder without either releasing the brakes or relaxing the grip of the shoes on the wheels, the engineer may manipulate the cock $q$ to transmit air under a less pressure than that stored up in the air-cushion chamber. By this method a constant supply of fluid-pressure is maintained in the air-reservoir on the car, and there is no longer need for a main air-reservoir on the locomotive, as heretofore.

In Fig. 3 the always-open one-way passage D and check-valve $d$ is shown through the piston G instead of entirely at one side, as in Fig. 2. The case A, drip-chamber B, and air-cushion chamber L are here shown united in a single casting instead of being composed of three pieces, as in Fig. 2. A cap, $A^3$, is bolted over and constitutes the top of the air-cushion chamber. As shown in this figure, the device can be more cheaply constructed.

As already explained, the form, and to some extent the arrangement of the valves, ports, and passages, may be varied or changed without materially affecting the operation of the parts herein combined, and I hereby include such modifications as within the scope of my invention. I also include herein as an equivalent for the air-cushion chamber any substitute—such as a spring—which may be compressed by the maximum fluid-pressure, and then, when such pressure is reduced to apply the brake, will, like the air-cushion, hold the valve H while the brake-cylinder is replenished or recharged. Any such equivalent or substitute as produces substantially a like operation or result I here include as of my invention.

While the several novel features—to wit, air-cushion chamber L, the release-valve N, and the always-open one-way-only passage D—are adapted and specially designed for use without reference to and independent of a main air-reservoir on the locomotive, and are so shown here, said features may nevertheless be used, with all their resulting advantages unimpaired, in connection with a main air-storage reservoir on the locomotive, as now employed by the Westinghouse system of automatic brakes. Therefore my claims hereinafter given, apply and cover said features in both said systems. In the event of the accidental separation of the cars of a train, the brakes will at once be applied as in the automatic brake-system.

By my improvements very important results are attained—to wit, a brake is provided which affords the principal advantages of the automatic system, as well as the principal advantages of the "direct" compressed-air system, without the disadvantages or difficulties heretofore experienced in either.

Having described my invention, I claim and desire to secure by Letters Patent of the United States—

1. In fluid-pressure brakes, the combination, with the train-pipe and an air-reservoir on the car, of a passage between the two always open one way only adapted at all times to allow fluid-pressure to enter the air-reservoir, substantially as set forth.

2. In fluid-pressure brakes, the combination, with a brake-cylinder, an air-reservoir on the car, and valve mechanism to open and close connection between the cylinder and reservoir, of means, substantially as described, whereby the brake-cylinder may be directly recharged with fluid-pressure from a single line of train-pipe while the brakes are applied, as set forth.

3. In fluid-pressure brakes, the combination, with a brake-cylinder, an air-reservoir on the car, and valve mechanism to open and close connection between these two, of an air-cushion chamber provided with means by which air compressed in the chamber will hold the valve mechanism to maintain communication between the reservoir and cylinder, substantially as set forth.

4. In a fluid-pressure brake, the combination of a brake-cylinder, an air-reservoir on the car, valve mechanism to open and close connection between the cylinder and reservoir, means, substantially as described, to hold the valve mechanism, air-compressing apparatus on the locomotive, and train-pipe to connect directly between the air-compressing apparatus and the said appliances on the car, whereby the usual main air-reservoir on or near the locomotive is dispensed with, as set forth.

5. In a fluid-pressure brake, the combination of a brake-cylinder, an air-reservoir on the car, valve mechanism to open and close connection between the cylinder and reservoir, means, substantially as described, to hold the valve mechanism, and a passage always open one way only to allow fluid-pressure from the train-pipe to enter the brake-cylinder while the brakes are applied, as set forth.

6. In fluid-pressure brakes, the combination, with the valve mechanism which opens and closes communication between the brake-cylinder and air-reservoir, of a brake-releasing valve adapted, when fluid-pressure is applied in the train-pipe, to release the pressure back of the valve mechanism, substantially as set forth.

7. In fluid-pressure brakes, the method of applying and maintaining the application of the brakes through a single line of train-pipe, consisting of first applying the brakes by the admission to the brake-cylinder of the fluid-pressure in the air-reservoir on the car, and then maintaining the application of the brakes by the admission to the brake-cylinder of fluid-pressure directly from the air-compressing apparatus on the locomotive, as set forth.

8. In fluid-pressure brakes, the method of applying and maintaining the application of the brakes through a single line of train-pipe, consisting of compressing air and transmitting the maximum pressure to the air-reservoir on the car, applying the brakes from the air-reservoir by reducing the pressure in the train-pipe, and then, when through a lessening of the pressure by leakage it is desired to recharge, transmitting through the train-pipe compressed air under a less pressure than the maximum, as set forth.

In testimony whereof I affix my signature in presence of two witnesses.

GEO. A. BOYDEN.

Witnesses:
J. EDWARD MORRIS,
JNO. T. MADDOX.